United States Patent
Bly et al.

(10) Patent No.: US 7,272,149 B2
(45) Date of Patent: *Sep. 18, 2007

(54) BANDWIDTH ALLOCATION SYSTEMS AND METHODS

(75) Inventors: Keith Michael Bly, Newman Lake, WA (US); C Stuart Johnson, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 996 days.

This patent is subject to a terminal disclaimer.

(21) Appl. No.: 10/224,353

(22) Filed: Aug. 19, 2002

(65) Prior Publication Data

US 2004/0032875 A1    Feb. 19, 2004

(51) Int. Cl.
*H04L 12/28* (2006.01)
*H04L 12/56* (2006.01)

(52) U.S. Cl. .................................... 370/414; 370/418

(58) Field of Classification Search .................... None
See application file for complete search history.

(56) References Cited

U.S. PATENT DOCUMENTS

| | | | |
|---|---|---|---|
| 5,164,938 A | 11/1992 | Jurkevich et al. | 370/231 |
| 5,748,629 A | 5/1998 | Caldara et al. | 370/230 |
| 5,758,137 A | 5/1998 | Armstrong, Jr. et al. | 713/502 |
| 5,872,769 A | 2/1999 | Caldara et al. | 370/230 |
| 5,953,318 A | 9/1999 | Nattkemper et al. | 370/236 |
| 5,999,518 A | 12/1999 | Nattkemper et al. | 370/258 |
| 5,999,563 A | 12/1999 | Polley et al. | 375/222 |
| 6,031,573 A | 2/2000 | MacCormack et al. | 348/401 |
| 6,052,375 A | 4/2000 | Bass et al. | 370/412 |
| 6,067,298 A * | 5/2000 | Shinohara | 370/395.71 |
| 6,157,955 A | 12/2000 | Narad et al. | 309/228 |
| 6,195,355 B1 | 2/2001 | Demizu | 370/397 |
| 6,205,118 B1 | 3/2001 | Rathnavelu | 370/229 |
| 6,259,699 B1 | 7/2001 | Opalka et al. | 370/398 |
| 6,275,497 B1 | 8/2001 | Varma et al. | 370/431 |
| 6,343,081 B1 | 1/2002 | Blanc et al. | 370/411 |
| 6,438,134 B1 | 8/2002 | Chow et al. | 370/412 |
| 6,445,707 B1 | 9/2002 | Iuoras et al. | 370/395.43 |
| 6,477,144 B1 * | 11/2002 | Morris et al. | 370/230.1 |
| 6,487,212 B1 | 11/2002 | Erimli et al. | 370/413 |
| 6,628,652 B1 | 9/2003 | Chrin et al. | 370/386 |
| 6,714,553 B1 | 3/2004 | Poole et al. | 370/412 |
| 6,754,206 B1 | 6/2004 | Nattkemper et al. | 370/369 |
| 6,950,400 B1 | 9/2005 | Tran et al. | 370/236 |
| 6,980,552 B1 | 12/2005 | Belz et al. | 370/392 |
| 7,042,841 B2 * | 5/2006 | Abdelilah et al. | 370/229 |
| 7,058,789 B2 | 6/2006 | Henderson et al. | 711/220 |

(Continued)

*Primary Examiner*—Chi Pham
*Assistant Examiner*—Ronald Abelson
(74) *Attorney, Agent, or Firm*—Wells St. John P.S.

(57) ABSTRACT

A system for shaping traffic from a plurality of data streams includes a queuing stage having a plurality of first-in, first-out shaping queues, the queuing stage being configured to classify incoming entries of traffic, and to assign an incoming element of traffic to a selected queue of the first queuing stage depending on characteristics of the element, the queuing stage further being configured to allocate bandwidth to each of the queues using time division multiplexing. A method for shaping traffic from a plurality of data streams includes providing a plurality of first-in, first-out queues; assigning traffic to the queues depending on the characteristics of the traffic; and controlling traffic flow out of the queues using a bandwidth allocation table.

36 Claims, 5 Drawing Sheets

U.S. PATENT DOCUMENTS

| | | | |
|---|---|---|---|
| 7,072,295 B1 | 7/2006 | Benson et al. | 370/230 |
| 2001/0001608 A1 | 5/2001 | Parruck et al. | 370/232 |
| 2001/0017866 A1 | 8/2001 | Takada et a. | 370/535 |
| 2001/0018711 A1 | 8/2001 | Morris | 709/229 |
| 2001/0030956 A1 | 10/2001 | Chillariga et al. | 370/348 |
| 2001/0038628 A1 | 11/2001 | Ofek et al. | 370/392 |
| 2001/0055303 A1 | 12/2001 | Horton et al. | 370/389 |
| 2001/0055319 A1 | 12/2001 | Quigley et al. | 370/480 |
| 2002/0023168 A1 | 2/2002 | Bass et al. | 709/232 |
| 2002/0034162 A1 | 3/2002 | Brinkerhoff et al. | 370/229 |
| 2002/0044567 A1 | 4/2002 | Voit et al. | 370/467 |
| 2002/0071387 A1* | 6/2002 | Horiguchi et al. | 370/229 |
| 2002/0172273 A1 | 11/2002 | Baker et al. | 375/222 |
| 2002/0191622 A1* | 12/2002 | Zdan | 370/401 |
| 2003/0076848 A1* | 4/2003 | Bremler-Barr et al. | 370/412 |
| 2006/0233156 A1 | 10/2006 | Sugai et al. | 370/351 |

* cited by examiner

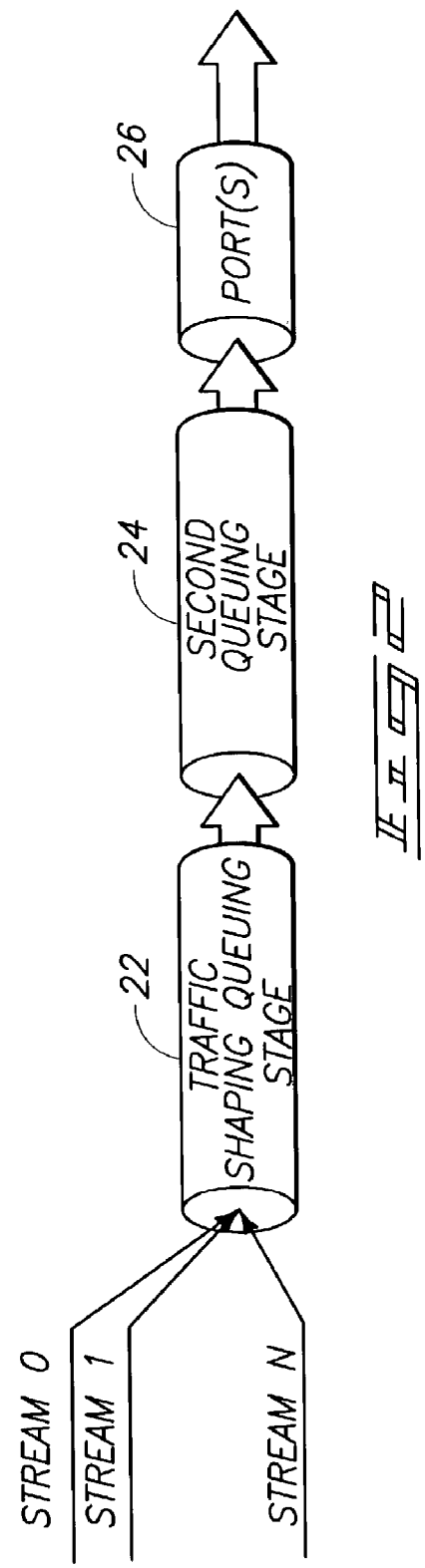

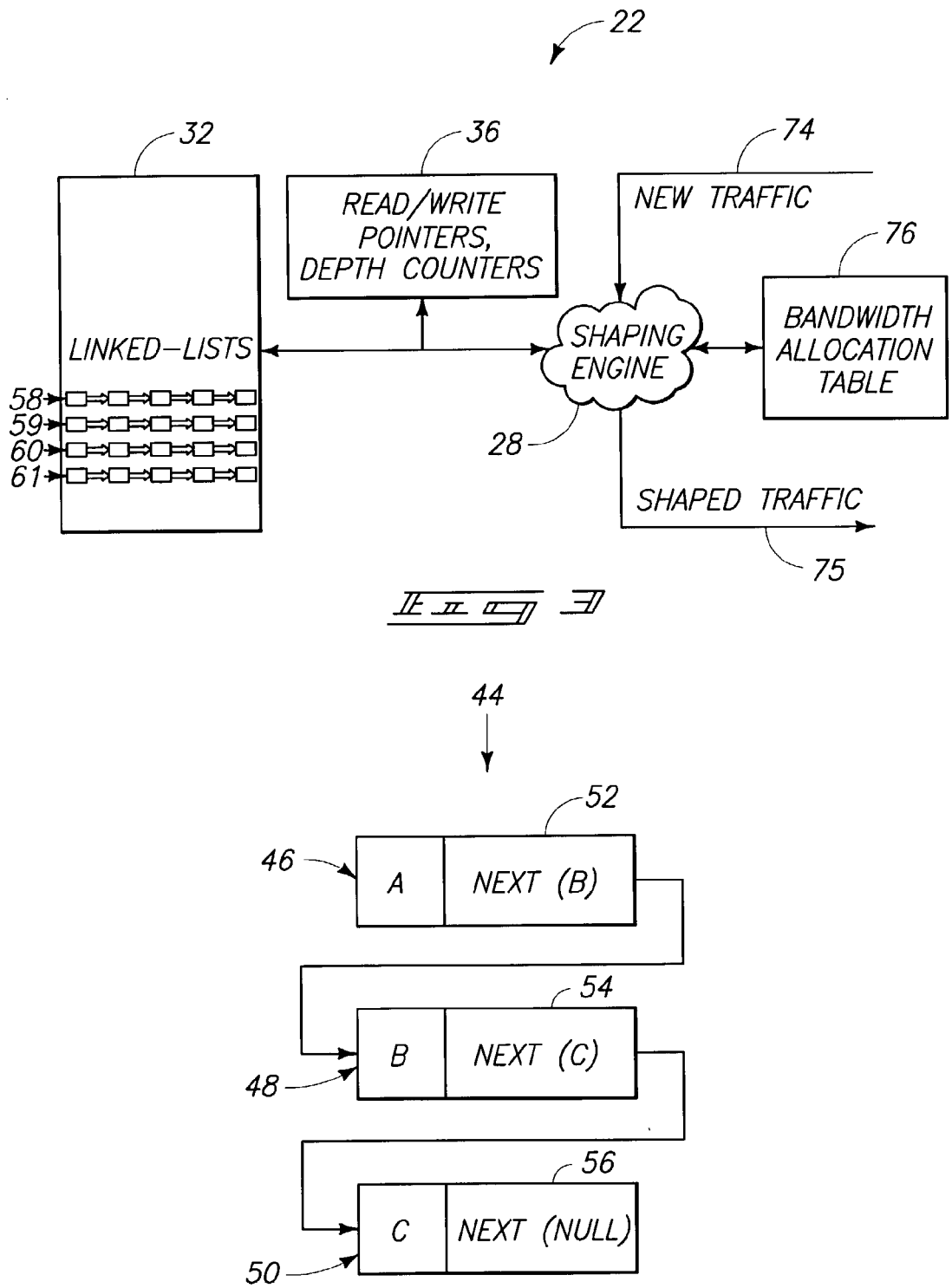

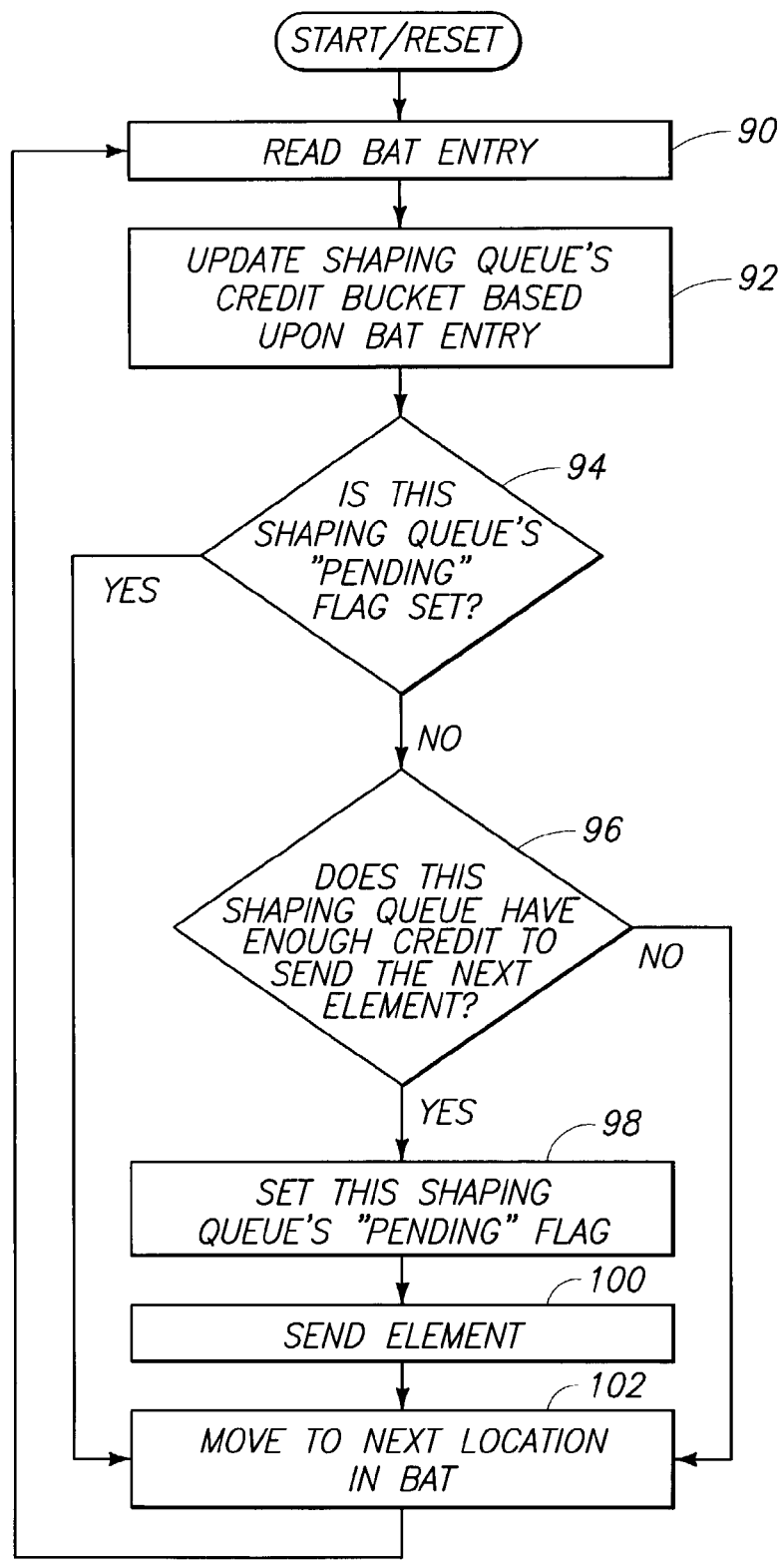

BANDWIDTH ALLOCATION SYSTEMS AND METHODS

TECHNICAL FIELD

The invention relates to methods and apparatus for improving communications in digital networks. The invention also relates to bandwidth control in digital networks and traffic shaping in digital networks.

BACKGROUND OF THE INVENTION

Traffic shaping is important in digital networks. Traffic shaping involves buffering traffic and sending traffic based upon a desired profile. A traffic profile can include but is not limited to having the following properties: a level of priority relative to other traffic, buffer depth, latency through the buffer, jitter in sending the traffic contained in the buffer, and a rate at which the traffic should be sent. A common approach to traffic shaping involves the use of a queuing system to manage the profile. As traffic arrives, it is placed on the queue. The traffic is de-queued based upon its assigned drain rate. This is illustrated in FIG. 1. A single stream of traffic arrives at the input of a queue at a rate depicted by plot 10. The desired output profile is depicted by the line 12. It is highly desirable to smooth the input such that the output approaches the desired profile 12.

The profile 12 is easy to define, but difficult to implement while still taking into account such issues as instantaneous jitter and granularity of rate allocation across a broad range of desired rates, particularly in systems having a large number of queues (e.g., over 32 queues).

Problems with some prior devices include, for example, lack of scalability, sheer size and high gate-count cost per queue for decentralized shaping engines, expensive caching/arbitration mechanisms, and lack of ability to shape traffic with fine granularity across a broad spectrum of desired rates.

SUMMARY OF THE INVENTION

The invention provides for a system for shaping traffic from a plurality of data streams, the system comprising a queuing stage configured to shape traffic from the data streams and having a plurality of first-in, first-out queues, the queuing stage including a traffic shaping engine configured to assign traffic to the queues depending on the characteristics of the traffic, and the queuing stage including a bandwidth allocation table coupled to the shaping engine and configured to control traffic flow out of the queues.

Another aspect of the invention provides for a system for shaping traffic from a plurality of data streams, the system comprising a queuing stage having a plurality of first-in, first-out shaping queues, the queuing stage being configured to classify incoming entries of traffic, and to assign an incoming element of traffic to a selected queue of the first queuing stage depending on characteristics of the element, the queuing stage further being configured to allocate bandwidth to each of the queues using time division multiplexing.

Yet another aspect of the invention provides for a queuing stage for a data traffic shaping system, the queuing stage comprising a plurality of first-in, first-out queues; circuitry configured to classify incoming entries of traffic, and to assign an incoming element of traffic to a selected queue depending on characteristics of the element and to allocate bandwidth to each of the queues using time division multiplexing; and a table including locations identifying a queue and an amount of bandwidth credit to allocate to that queue, the circuitry being configured to allocate bandwidth to each of the queues using time division multiplexing by traversing the table at a constant rate to determine the bandwidth allocatable to each of the queues.

Another aspect of the invention provides for a queuing stage for a data traffic shaping system, the queuing stage comprising means for defining a plurality of first-in, first-out queues; means for classifying incoming entries of traffic, and for assigning an incoming element of traffic to a selected queue depending on characteristics of the element; means for allocating bandwidth to each of the queues using time division multiplexing; and means for defining a memory including locations identifying a queue and an amount of bandwidth credit to allocate to that queue, the bandwidth allocating means being configured to allocate bandwidth to each of the queues using time division multiplexing by traversing the locations at a constant rate to determine the bandwidth allocatable to each of the queues.

Another aspect of the invention provides a method for shaping traffic from a plurality of data streams, the method comprising a plurality of first-in, first-out queues, assigning traffic to the queues depending on the characteristics of the traffic, and controlling traffic flow out of the queues using a bandwidth allocation table.

Another aspect of the invention provides a method for shaping traffic from a plurality of data streams, the method comprising a plurality of first-in, first-out shaping queues, classifying incoming entries of traffic, assigning an incoming element of traffic to a selected queue depending on characteristics of the element, and allocating bandwidth to each of the queues using time division multiplexing.

Another aspect of the invention provides a method for queuing traffic in queuing stage for a data traffic shaping system, the method comprising a plurality of first-in, first-out queues; classifying incoming entries of traffic; assigning an incoming element of traffic to a selected queue depending on characteristics of the element; and allocating bandwidth to each of the queues using time division multiplexing using a table including locations identifying a queue and an amount of bandwidth credit to allocate to that queue, by traversing the table at a constant rate to determine the bandwidth allocatable to each of the queues.

Another aspect of the invention provides a method for queuing traffic in queuing stage for a data traffic shaping system, the method comprising a plurality of first-in, first-out queues; providing a memory including locations identifying a queue and an amount of bandwidth credit to allocate to that queue; classifying incoming entries of traffic; assigning an incoming element of traffic to a selected queue depending on characteristics of the element; and allocating bandwidth to each of the queues using time division multiplexing by traversing the memory locations at a constant rate to determine the bandwidth allocatable to each of the queues.

BRIEF DESCRIPTION OF THE DRAWINGS

Preferred embodiments of the invention are described below with reference to the following accompanying drawings.

FIG. 2 is a block diagram showing a traffic shaping queuing stage receiving a plurality of incoming traffic streams.

FIG. 3 is a block diagram illustrating construction details of the traffic shaping queuing stage of FIG. 2.

FIG. 4 is a simplified illustration of a linked list that could included in the traffic shaping queuing stage of FIG. 3.

FIG. 7 is a block diagram of a finite state machine that is used with the table of FIG. 5.

DETAILED DESCRIPTION OF THE PREFERRED EMBODIMENTS

Figure 1:
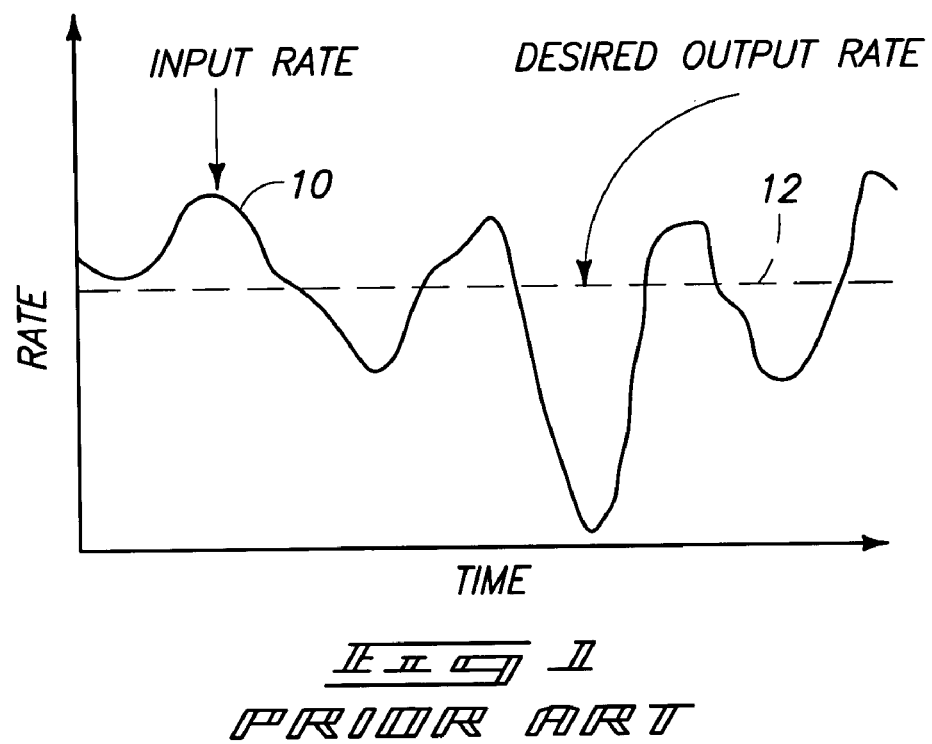
FIG. 1 is a plot of rate versus time illustrating the difference between data traffic input rate and desired output rate.

This disclosure of the invention is submitted in furtherance of the constitutional purposes of the U.S. Patent Laws "to promote the progress of science and useful arts" (Article 1, Section 8).

Attention is directed to a commonly assigned U.S. patent application Ser. No. 10/224,508, filed Aug. 19, 2002, titled Hierarchical Queuing, and naming as inventors Keith Michael Bly and C Stuart Johnson, which is incorporated herein by reference.

FIG. 2 shows a queuing structure, with a traffic shaping queuing stage 22 responsible for shaping of traffic. Shaped traffic is transferred from the stage 22 to a port or pipe 26 either directly, or via a second stage 24 such as a caching or arbitration mechanism or a congestion handling queuing stage such as is described in the above incorporated patent application.

The stage 22 has a shaping engine 28 (see FIG. 3) which can be defined, for example by a microprocessor, or other digital circuitry. The stage 22 includes linked lists 32 (see FIG. 3) which define (together with pointers and counters 36) "shaping" queues. For illustration purposes, shaping queues 58, 59, 60, and 61 are shown; however, different numbers of queues and different depths than illustrated are possible. Two tables are used to house the shaping queues 58-61: one table 32 for the linked-lists, and the other table 36 to hold read/write and head/tail pointers, depth counters, etc., for the linked-lists. Other configurations are possible. The stage 22 also includes a bandwidth allocation table 76 which will be described below in greater detail.

Pointers and linked lists are known in the computer arts. A pointer is a variable that points to another variable by holding a memory address. A pointer does not hold a value but instead holds the address of another variable. A pointer points to the other variable by holding a copy of the other variable's address. A read/write pointer keeps track of a position within a file from which data can be read or written to. A linked list is a chain of records called nodes. Each node has at least two members, one of which points to the next item or node in the list. The first node is the head, and the last node is the tail. Pointers are used to arrange items in a linked list, as illustrated in FIG. 4.

FIG. 4 shows a simplified example of a linked list 44 of the type that could be included in the linked lists 32 and illustrates linked list editing. Each entry or node 46, 48, and 50 (A, B, and C) includes a pointer 52, 54, and 56 pointing to another node. The link lists 32 of FIG. 3 are arranged such that the queues 58-61 are all first-in, first out queues (FIFO).

The shaping engine 28 (see FIG. 3) en-queues incoming traffic 74 onto a selected one of the shaping queues 58-61 based upon look-up information, which classifies the traffic. Streaming audio or video would be classified differently than e-mail, because streaming audio or video requires sufficient bandwidth to play without interruption. Therefore like-traffic, such as a stream or set of streams is placed on the same one of the shaping queues 58-61. "Like traffic" can be defined as desired for a particular application. It could be, for example, "all video traffic", or it could be "all pay-per-view" video traffic, or it could be "all traffic for customer X", or it could be all email traffic. It is a grouping of traffic with similar needs. Video, for example requires a fast rate, with low latency and jitter influences. Email on the other hand, can be handled on a "best efforts" basis; i.e. low-priority, without regard to latency and jitter.

This shaping queue can have a shaping profile, which includes properties such as: priority, depth, latency, jitter, and rate. For example, video needs to always get through. A large amount of latency is not desirable for video, as any latency will cause the resulting picture to become jerky, and fall behind. The same is true of the rate at which video is sent. A constant, consistent stream should be used to supply the video information "just in time" for the next entry or element (e.g., packet or frame) of the picture on a TV or computer. Therefore, "video" traffic is properly classified so that it is managed appropriately. Because the video must always get through, it is given a "high" priority. Because video cannot be influenced/slowed-down with a large amount latency, the depth of the queue is selected to be shallow. Therefore, little data can build up, waiting in the queue. With regard to rate, the video queue gets its own bandwidth end-to-end on a switch, and does not have to compete with any other queue for bandwidth. Queues for other classifications of traffic would similarly have appropriately chosen priorities, depths, latencies, jitter, and rates.

In the illustrated embodiment, the rate-algorithm for the shaping queues 58-61 is a centralized time division multiplexing algorithm that is implemented, for example, by the shaping engine 28. More particularly, in the illustrated embodiment, the rate-algorithm for shaping traffic across many queues uses a table based credit allocation scheme. A fixed size bandwidth allocation table (BAT) 76 is traversed at a constant rate. Each location (e.g. row) 78-85 (FIG. 5) in the table identifies a shaping queue 58-61 and the amount of credit to allocate to that shaping queue 58-61. Because the table is traversed at a known rate, the desired rate for one of the shaping queues 58-61 can be achieved by loading a specific number of entries in the table with a specific amount of credit for that shaping queue. This defines the rate at which entries can be de-queued from a queue per the following equation:

Queue Rate=(total credit in table for this queue)÷(time to traverse table)

As long as there is enough traffic to keep the queue from being empty, this drain rate can be maintained indefinitely. The rate itself is calculated by dividing the amount of credit listed in the table 76 by the time it takes to traverse the table 76 one time. A shaping queue 58-61 is considered eligible to send an entry or element (e.g., a packet or, more particularly, a frame) when the queue 58-61 has acquired enough credit to send the entry in question.

In the illustrated embodiment, the shaping engine 28 manages both adding and deleting from the shaping queues, as well as updating the shaping queues with bandwidth tokens from the bandwidth allocation table 76.

Based upon the needs of the design in which this queuing structure is implemented, the size of the table 76 can be adjusted to provide the desired minimum and maximum achievable rates. The minimum rate is defined by one credit divided by the table traversal time, and the maximum rate is defined by the maximum number of entries allowed in the table, each containing the maximum number of credits, divided by the table traversal time. The maximum number of entries allowed in the table 76 is dictated by the implementation. For example, the maximum number of entries allowed in the table is determined by the overall "profile" of the port(s) 26 supported by this queuing structure, etc. More particularly, the maximum number of entries allowed in the table is determined by the circuitry or software (e.g., see FIG. 7) that manages traversing the table 76 relative to the number of queues 58-61 in the implementation, and how it manages updating the credit for each queue 58-61. Though a certain number of queues is shown in FIG. 3, other numbers are possible)

Because there are so many queues 58-61, each of which is capable of sustaining the rate of the port or pipe 26 that they service, there is no need to service more than a handful of queues at a time. This is analogous to an eight lane highway leading to a two lane bridge. The more queues that are active, the less often any particular one needs to be accessed. In the case of our analogy, the more lanes there are, the less often a car from a given lane is sent across the bridge, relative to the other lanes. Therefore, a small engine can manage a relatively large number of queues. Consider the following definitions:

N is the base rate for a single port or pipe 26. In other words, N is the maximum rate that a single stream (see FIG. 2) could sustain.

M is the number of operations. In other words, M is the maximum number of streams allowed to sustain N in parallel.

P is the maximum number of streams allowed per N.

T is the granularity of N. In other words, T is the smallest measurable element of N, in terms of the traffic being sent at rate N; e.g., bits, bytes, cells, frames, etc.

Q is the minimum number of entries in the table 76.

Using these definitions, characteristics of the engine 28 needed to manage credit updating can be provided as follows.

1. The minimum rate at which the engine must run is M/T or, in other words, the engine must complete M operations in time T, in order to sustain M streams in parallel, each at rate N
2. The minimum number of entries, Q, needed in the bandwidth allocation table 76 is M*P.
3. The minimum shaping rate per stream is 1/(T*Q).
4. The maximum shaping rate per stream is N.

Therefore, if at most M streams can be sustained at rate N, as the rate is reduced for at least one of these streams, fewer updates of credit is required for those streams that are at less than rate N. This creates room for more streams to be updated by the engine 28, with the limit being P*M streams.

When one of the shaping queues 58-61 in the traffic shaping queuing stage 22 becomes eligible to send traffic based upon its rate-algorithm, the first entry in the queue is transferred to a port or ports 26 either directly, via a caching or arbitration mechanism, or via a second queuing stage 24 (see FIG. 2). A shaping queue 58-61 is eligible to send an entry when it has earned enough credit relative to the first/next entry waiting to be sent on that queue. This eligibility is typically based upon a single relationship. In the preferred embodiment, this relationship is (queue's credit>=number of bytes) of the entry. One appropriate second queuing stage is described in the above incorporated patent application, titled Hierarchical Queuing, naming as inventors Keith Michael Bly and C Stuart Johnson). In one embodiment, where a second queuing stage 24 is included, this transfer only happens if the shaping queue 58-61 in question does not already have an entry pending in the second queuing stage 24. Whenever an entry is sent to the second queuing stage, the first stage keeps track of this by, for example, setting a "pending" flag for that specific shaping queue. The pending flag is only lowered when the second queuing stage 24 de-queues that specific entry. At that time, the shaping queue 58-61 reevaluates its shaping status to see if it is again eligible to send the next entry (assuming the shaping queue is not empty).

Figure 6:
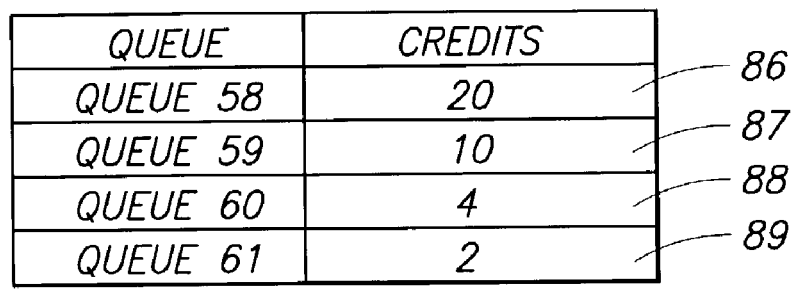
FIG. 6 is a table illustrating credits earned after traversing the table of FIG. 4 one time.

FIG. 7 is a flowchart depicting how the shaping engine 28 adds bandwidth credits listed in the bandwidth allocation table 76 to the credit buckets 86-89 (see FIG. 6) of the shaping queues 58-61, and how the shaping engine 28 determines that a shaping queue has enough credit to send an element (e.g. an entry, packet or frame). The flowchart of FIG. 7 is traversed once for each operation M.

In step 90, the shaping engine 28 reads an entry from the bandwidth allocation table 76. After performing step 90, the shaping engine 28 proceeds to step 92.

In step 92, the shaping engine 28 updates a shaping queue's credit bucket 86, 87, 88, or 89 based upon the entry in the bandwidth allocation table 76. After performing step 92, the shaping engine 28 proceeds to step 94.

In step 94, the shaping engine 28 determines whether this queue's "pending" flag is set. If so, the shaping engine 28 proceeds to step 102; if not, the shaping engine 28 proceeds to step 96.

In step 96, the shaping engine 28 determines whether this queue has enough credit to send the next element. If so, the shaping engine proceeds to step 98; if not, the shaping engine proceeds to step 102.

In step 98, the shaping engine 28 sets this shaping queue's "pending" flag. After performing step 98, the shaping engine proceeds to step 100.

In step 100, the shaping engine 28 sends the element. After performing step 100, the shaping engine 28 proceeds to step 102.

Figure 5:
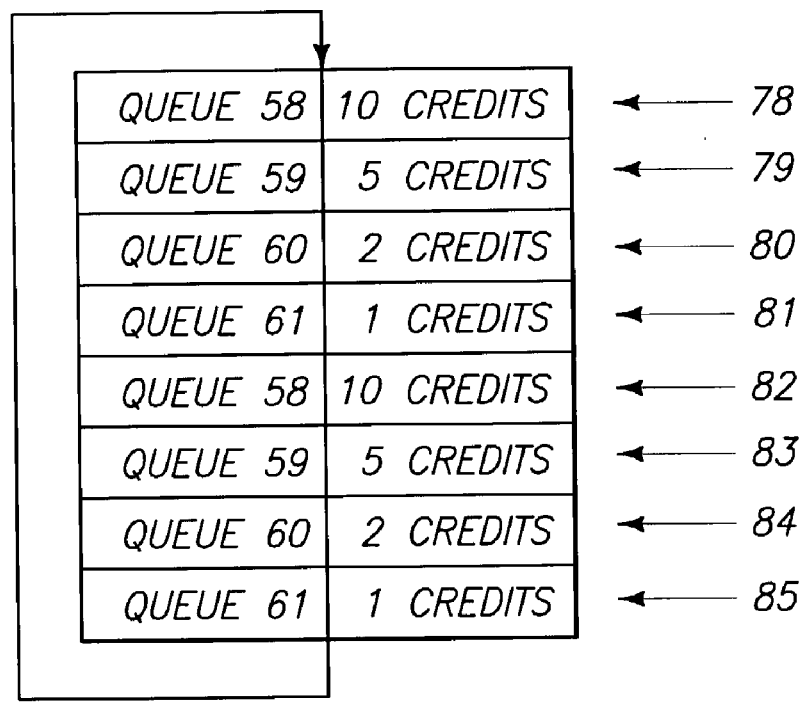
FIG. 5 illustrates a table based credit allocation scheme used in the shaping queuing stage of FIG. 3.

In step 102, the shaping engine 28 moves to the next location in the bandwidth allocation table 76 (e.g., one row down in the embodiment shown in FIG. 5). After performing step 102, the shaping engine 28 proceeds to step 90.

Thus, one aspect of the invention provides the ability to manage the shaping and crediting of a large number of queues by a central shaping engine. An advantage of the preferred embodiment is the ability to fine tune the rate of a given queue in the minimum division of rate allowed, from N/Q to N, rather than having a fixed subset of rates or small subsets of increments relative to the gross size of the rate. The preferred embodiment provides a solution that is scalable, providing the ability to shape traffic for a variety of implementations in a cost effective manner. This results in a smaller overall design.

The preferred embodiment of the invention provides a centralized queuing structure, capable of supporting one or more ports, with a high queue density count. This centralized queuing structure is capable of dynamically supporting different ports over time, rather than a fixed set of queues only able to support a single port or ports. The design of the preferred embodiment is also scalable. The design of the preferred embodiment, by its very nature, can be implemented for one queue up to the feasible limits of today's technology, without significantly increasing the size of the central engine. The only increase to the cost of increasing size is the space needed for the linked-list management.

Further, the design of the preferred embodiment by its very nature can be implemented to support an infinite variety of min/max rate relationships. Previous implementations could only perform gross granularity transitions for various desired rates.

The preferred environment is all of Ethernet. Slight modification to "shaping" profiles would allow for use in any communication technology including, for example, ATM and SONET.

In one embodiment, the first queuing stage is included in a single ASIC, which provides for sufficient clock-speed to support Gigabit Ethernet rates.

Various alternative embodiments are possible. For example, one alternative embodiment has a reduced or increased number of shaping queues.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system for shaping traffic from a plurality of data streams, the system comprising:
a queuing stage configured to shape traffic from the data streams and having a plurality of first-in, first-out queues, the queuing stage including a traffic shaping engine configured to assign traffic to the queues depending on the characteristics of the traffic, and the queuing stage including a bandwidth allocation table coupled to the traffic shaping engine and configured to control traffic flow out of the queues, the traffic shaping engine being configured to compare an amount of bandwidth allocated to one of the queues according to the bandwidth allocation table with a length of a next element of traffic to be transmitted out of the one queue and configured to transmit the next element of traffic out of the one queue only if the amount of bandwidth allocated to the one queue is greater than or equal to the length, the queuing stage being configured to assign priorities to the queues; and
a second queuing stage coupled to the first queuing stage to receive traffic transferred from the first mentioned queuing stage and to receive the priority of the transferred traffic separate from the transferred traffic, and including a plurality of priority queues such that, when traffic is transferred from the first mentioned queuing stage to the second queuing stage, the first mentioned queuing stage informs the second queuing stage of the priority of the transferred traffic and the transferred traffic is placed onto a predetermined priority queue of the second queuing stage based on the priority.

2. A system for shaping traffic in accordance with claim 1 wherein the queuing stage is defined, at least in part, by linked lists.

3. A system for shaping traffic in accordance with claim 1 wherein the bandwidth allocation table defines a time division multiplexor configured to allocate time, for traffic flow out of the queues, to individual queues, in a sequence.

4. A system for shaping traffic in accordance with claim 3 wherein the bandwidth allocation table is traversed at a fixed rate.

5. A system for shaping traffic in accordance with claim 3 wherein the shaping engine is configured to direct pointers to frames of traffic coming in to the first stage to a selected one of the shaping queues depending on a characteristic of the frame.

6. A system for shaping traffic from a plurality of data streams, the system comprising:
a queuing stage having a plurality of first-in, first-out shaping queues, the queuing stage being configured to classify incoming entries of traffic, and to assign an incoming element of traffic to a selected queue of the first queuing stage depending on characteristics of the element, the queuing stage further being configured to allocate bandwidth to each of the queues using time division multiplexing, compare an amount of bandwidth allocated to one of the queues with a length of a next element of traffic to be transmitted out of the one queue, and transmit the next element of traffic out of the one queue if the amount of bandwidth allocated to the one queue is greater than or equal to the length, the queuing stage being configured to assign priorities to the queues; and
a second queuing stage coupled to the first queuing stage to receive traffic transferred from the first mentioned queuing stage and to receive the priority of the transferred traffic independent of the transferred traffic, and including a plurality of priority queues such that, when traffic is transferred from the first mentioned queuing stage to the second queuing stage, the first mentioned queuing stage informs the second queuing stage of the priority of the transferred traffic and the transferred traffic is placed onto a predetermined priority queue of the second queuing stage based on the priority.

7. A system for shaping traffic in accordance with claim 6 wherein the queuing stage includes a traffic shaping engine configured to assign the incoming element of traffic to a selected queue of the first queuing stage depending on characteristics of the element and to allocate the bandwidth to each of the queues using time division multiplexing.

8. A system for shaping traffic in accordance with claim 7 and further comprising a bandwidth allocation table coupled to the traffic shaping engine for use by the traffic shaping engine in allocating bandwidth.

9. A system for shaping traffic in accordance with claim 7 wherein the queuing stage includes a plurality of linked lists coupled to the traffic shaping engine, and wherein the linked lists define, at least in part, the shaping queues.

10. A queuing stage for a data traffic shaping system, the queuing stage comprising:
a plurality of first-in, first-out queues;
circuitry configured to classify incoming entries of traffic, assign an incoming element of traffic to a selected queue depending on characteristics of the element, allocate bandwidth to each of the queues using time division multiplexing, compare an amount of bandwidth allocated to one of the queues with a length of a next element of traffic to be transmitted out of the one queue and transmit the next element of traffic out of the one queue if the amount of bandwidth allocated to the one queue is greater than or equal to the length;
a table including locations identifying a queue and an amount of bandwidth credit to allocate to that queue, the circuitry being configured to allocate bandwidth to each of the queues using time division multiplexing by traversing the table at a constant rate to determine the bandwidth allocatable to each of the queues; and wherein the queuing stage is configured to assign priorities to the queues, and to selectively transfer traffic to a second queuing stage such that, when traffic is transferred from the first mentioned queuing stage to the second queuing stage, the first mentioned queuing stage informs the second queuing stage of the priority of the transferred traffic via a communication that is separate from the transferred traffic.

11. A queuing stage in accordance with claim 10 wherein the queues are defined, at least in part, by linked lists.

12. A queuing stage in accordance with claim 10 wherein the circuitry is configured to direct individual frames of traffic coming in to the queuing stage to selected ones of the queues depending on characteristics of the frames.

13. A queuing stage for a data traffic shaping system, the queuing stage comprising:
    means for defining a plurality of first-in, first-out queues;
    means for classifying incoming entries of traffic, and for assigning an incoming element of traffic to a selected queue depending on characteristics of the element;
    means for allocating bandwidth to each of the queues using time division multiplexing;
    means for comparing an amount of bandwidth allocated to one of the queues with a length of a next element of traffic to be transmitted out of the one queue;
    means for transmitting the next element of traffic out of the one queue only if the amount of bandwidth allocated to the one queue is greater than or equal to the length;
    means for defining a memory including locations identifying a queue and an amount of bandwidth credit to allocate to that queue, the bandwidth allocating means being configured to allocate bandwidth to each of the queues using time division multiplexing by traversing the locations at a constant rate to determine the bandwidth allocatable to each of the queues;
    means for assigning priorities to the queues, and for selectively transferring traffic to a second queuing stage; and
    means for, when traffic is transferred from the first mentioned queuing stage to the second queuing stage, informing the second queuing stage of the priority of the transferred traffic via a communication that is separate from the transferred traffic.

14. A queuing stage in accordance with claim 13 wherein the means for defining the queues comprises linked lists.

15. A queuing stage in accordance with claim 13 wherein the classifying and assigning means is configured to direct pointers to frames of traffic coming in to the queuing stage to selected ones of the queues depending on characteristics of the frames.

16. A method for shaping traffic from a plurality of data streams, the method comprising:
    providing a plurality of first-in, first-out queues;
    assigning traffic to the queues depending on the characteristics of the traffic;
    controlling traffic flow out of the queues using a bandwidth allocation table;
    comparing an amount of bandwidth allocated to one of the queues with a length of a next element of traffic to be transmitted out of the one queue;
    transmitting the next element of traffic out of the one queue only if the amount of bandwidth allocated to the one queue is greater than or equal to the length;
    assigning priorities to the queues; and
    selectively transferring traffic to a second queuing stage such that, when traffic is transferred to the second queuing stage, the second queuing stage is informed of the priority of the transferred traffic via a communication that is separate from the transferred traffic.

17. A method for shaping traffic in accordance with claim 16 and further comprising defining the queues, at least in part, using linked lists.

18. A method for shaping traffic in accordance with claim 16 wherein controlling traffic flow comprises using time division multiplexing to allocate time, for traffic flow out of the queues, to individual queues in a sequence.

19. A method for shaping traffic in accordance with claim 16 and further comprising traversing the bandwidth allocation table at a fixed rate.

20. A method for shaping traffic in accordance with claim 16 wherein the shaping engine is configured to direct individual frames of traffic coming in to the first stage to a selected one of the shaping queues depending on a characteristic of the frame.

21. A method for shaping traffic from a plurality of data streams, the method comprising:
    providing a plurality of first-in, first-out shaping queues;
    classifying incoming entries of traffic;
    assigning an incoming element of traffic to a selected queue depending on characteristics of the element;
    allocating bandwidth to each of the queues using time division multiplexing;
    comparing an amount of bandwidth allocated to one of the queues with a length of a next element of traffic to be transmitted out of the one queue;
    transmitting the next element of traffic out of the one queue only if the amount of bandwidth allocated to the one queue is greater than or equal to the length;
    assigning priorities to the queues; and
    selectively transferring traffic to a second queuing stage such that, when traffic is transferred to the second queuing stage, the second queuing stage is informed of the priority of the transferred traffic via a communication that is separate from the transferred traffic.

22. A method for shaping traffic in accordance with claim 21 wherein assigning the incoming element of traffic to a selected queue comprises using circuitry that also allocates the bandwidth to each of the queues using time division multiplexing.

23. A method for shaping traffic in accordance with claim 21 wherein allocating bandwidth to each of the queues using time division multiplexing comprises using a bandwidth allocation table.

24. A method for shaping traffic in accordance with claim 21 wherein allocating bandwidth to each of the queues using time division multiplexing comprises using a bandwidth allocation table having entries associated with each of the queues for allocating credit to each of the queues.

25. A method for shaping traffic in accordance with claim 24 wherein allocating bandwidth to each of the queues using time division multiplexing comprises accessing the entries in the table in a sequence at a fixed rate.

26. A method for shaping traffic in accordance with claim 24 and further comprising defining the queues using linked lists.

27. A method for queuing traffic in queuing stage for a data traffic shaping system, the method comprising:
    providing a plurality of first-in, first-out queues;
    classifying incoming entries of traffic;
    assigning incoming elements of traffic to the queues depending on characteristics of the elements;
    allocating bandwidth to each of the queues using time division multiplexing using a table including locations identifying a queue and an amount of bandwidth credit to allocate to that queue, by traversing the table at a constant rate to determine the bandwidth allocatable to each of the queues;

sending one of the elements in response to the queue to which the one of the elements is assigned being allocated at least an amount of bandwidth credit proportional to a length of the one of the elements;

sending another of the elements in response to the queue to which the another of the elements is assigned being allocated at least an amount of bandwidth credit proportional to a length of the another of the elements, the length of the another of the elements being different than the length of the one of the elements;

assigning priorities to the queues; and selectively transferring traffic to a second queuing stage such that, when traffic is transferred to the second queuing stage, the second queuing stage is informed of the priority of the transferred traffic via a communication that is separate from the transferred traffic.

28. A method for queuing traffic in accordance with claim 27 and further comprising defining the queues, at least in part, by linked lists.

29. A method of queuing traffic in accordance with claim 27 wherein assigning incoming elements of traffic to the queues comprises directing an individual incoming frame of traffic to a selected one of the queues depending on a characteristic of the frame.

30. A method of queuing traffic in accordance with claim 27 wherein the sending the one of the elements comprises transmitting the one of the elements out of the queue to which the one of the elements is assigned.

31. A method of queuing traffic in accordance with claim 27 wherein the queue to which the one of the elements is assigned is the queue to which the another of the elements is assigned.

32. A method for queuing traffic in queuing stage for a data traffic shaping system, the method comprising:

providing a plurality of first-in, first-out queues;

providing a memory including locations identifying a queue and an amount of bandwidth credit to allocate to that queue;

classifying incoming entries of traffic;

assigning an incoming element of traffic to a selected queue depending on characteristics of the element;

allocating bandwidth to each of the queues using time division multiplexing by traversing the memory locations at a constant rate to determine the bandwidth allocatable to each of the queues;

comparing the amount of bandwidth allocated to one of the queues with a length of a next element to be transmitted out of the one queue;

transmitting the next element out of the one queue only if the amount of bandwidth allocated to the one queue is greater than or equal to the length;

assigning priorities to the queues; and selectively transferring traffic to a second queuing stage such that, when traffic is transferred to the second queuing stage, the second queuing stage is informed of the priority of the transferred traffic via a communication that is separate from the transferred traffic.

33. A method for queuing traffic in accordance with claim 32 and further comprising defining the queues at least in part, by linked lists.

34. A method of queuing traffic in accordance with claim 32 wherein assigning an incoming element of traffic to a selected queue comprises directing an individual incoming frame of traffic to a selected one of the queues depending on a characteristic of the frame.

35. A method of queuing traffic in accordance with claim 32 wherein the next element to be transmitted out of the one queue comprises an element stored in the one queue longer than other elements concurrently stored in the one queue.

36. A method of queuing traffic in accordance with claim 32 wherein the length of the next element and the amount of bandwidth allocated to the one queue are both measured in bytes.

* * * * *